United States Patent [19]

Suzuki

[11] Patent Number: 5,135,991

[45] Date of Patent: Aug. 4, 1992

[54] PROCESS FOR PRODUCING POLYMER POWDER FROM MOLTEN MIXTURE OF POLYAMIDES

[75] Inventor: Hajime Suzuki, Hyogo, Japan

[73] Assignee: Daicel Hüls Ltd., Tokyo, Japan

[21] Appl. No.: 419,647

[22] Filed: Oct. 11, 1989

[30] Foreign Application Priority Data

Jan. 20, 1989 [JP] Japan .................. 64-11460
Mar. 22, 1989 [JP] Japan .................. 64-69500

[51] Int. Cl.$^5$ .............................................. C08G 69/46
[52] U.S. Cl. ........................................ 525/432; 528/310; 528/335
[58] Field of Search .................. 525/432; 528/310, 335

[56] References Cited

U.S. PATENT DOCUMENTS 4,555,566 11/1985 Arita et al. ..................... 528/310

OTHER PUBLICATIONS

Condensed Chemical Dictionary, Eighth Edition, 1971, p. 644.

Primary Examiner—Harold D. Anderson
Attorney, Agent, or Firm—Flynn, Thiel, Boutell & Tanis

[57] ABSTRACT

A polymer powder is produced by separately melting two or more of polymers and monomers which are reactive with each other, spraying a mixture of the polymers and the monomers, while continuously mixing them with each other, the mixture being solid at a normal temperature, having a melt viscosity of 1,000 cps or below at 300 degree C., then cooling the sprayed mixture to obtain a powder thereof, and solid phase-polymerizing it to obtain the polymer powder. It is useful for powder coating.

4 Claims, No Drawings

PROCESS FOR PRODUCING POLYMER POWDER FROM MOLTEN MIXTURE OF POLYAMIDES

The present invention relates to a process for producing a polymer powder In particular, the present invention relates to a process for producing a powder comprising nearly spherical particles of a polymer compound polymerizable in a solid phase, such as a polyamide.

PRIOR ART

Spherical polymer powders, particularly spherical polyamide powders, are widely used as a powder coating, cosmetic or lubricant. When, for example, such powders are used as a powder coating, more spherical powder particles will have higher fluidity and give smoother coating. Further, they can be used as a material for cosmetics or lubricants, since the spherical particles can slide smoothly relative to each other. However, since the spherical powder cannot be supplied at a low cost, it is only used for producing a quite expensive product such as a cosmetic, and usually a powder in the shape of a potato or crushed stone is used in other applications.

Polymer powders are formed usually by mechanical pulverization at an ambient or lower temperature. However, the powders thus formed are in the shape of crushed stone. A particular process includes one wherein a polymer compound is dissolved in a solvent and then reprecipitated (see Japanese Patent Laid-Open No. 223059/1986). Since, however, this process necessitates a large amount of solvent, a huge plant is required, which is unfavorable from the viewpoint of the production cost.

Another process is one wherein a lactam is dispersed in liquid paraffin and subjected to anionic polymerization (see Japanese Patent Publication No. 29832/1970). However, this process has defects in that a high cost is required for the isolation of the powder from the liquid paraffin and for the separation of the remaining catalyst and that a polyamide having excellent properties will be obtained. Although a process wherein a lactam is dissolved in a solvent and anionic polymerization conducted while precipitating the formed polyamide is under investigation, this process has a defect in that a large amount of the solvent is used and, therefore, a large plant is necessitated.

In addition, various processes wherein a molten polymer is melt-sprayed have been proposed. However these processes usually give rise to filamentous matter and the intended spherical powder is only obtained with difficulty.

SUMMARY OF THE INVENTION

An object of the present invention is to produce a polymer powder comprising nearly spherical particles by an easy and safe process at a low cost. In particular, the object of the present invention is to provide a polymer powder comprising nearly spherical particles and having excellent properties.

In the invention, a polymer powder is produced by separately melting two or more of polymers and monomers which are reactive with each other, spraying a mixture of the polymers and the monomers, while continuously mixing them with each other, the mixture being solid at a normal temperature, having a melt viscosity of 1,000 cps or below at 300 degree C., then cooling the sprayed mixture to obtain a powder thereof, and solid phase-polymerizing it to obtain the polymer powder. It is useful for powder coating.

It is preferred that the mixture has a melt viscosity of 500 cps or below.

Forming liquid drops of the mixture with a high speed-rotating disk, while mixing the polymers and the monomers with each other, may be further conducted, instead of the spraying step. The polymer and the monomer may be formed into a polyamide.

The mixture may be advantageously a polyamide resin composition comprising a first polyamide having carboxylic acid groups at 70 percent or above of the terminal groups thereof and a second polyamide having amine groups at 70 percent or above of the terminal groups thereof.

The invention further provides a polymer powder as obtained by the process as defined above. Moreover the invention provides a method for powder coating an article by using the polymer powder.

The polymeric compounds which can be produced by the present invention are those derived from polymers or monomers which cannot be substantially polymerized by themselves and which can undergo solid phase polymerization when two or more of them are mixed together. The polymeric compounds include polyamides, epoxy and polyurethane resins, among which, polyamide resins are the most desirable. The present invention can be conducted most desirably when a polyamide polymer having an amino group at each of its ends and a polyamide polymer having a carboxyl group at each of its ends are used.

The polyamide resins include nylon 6, nylon 66, nylon 610, nylon 612, nylon 11, nylon 12, copolymers of them and aromatic and alicyclic nylons.

In the present invention, additives such as a pigment, stabilizer and polymerization catalyst may be added to the polymers or monomers.

According to the process of the present invention, the polymer powder comprising nearly spherical particles can be easily obtained. Therefore, the polymer powder having excellent properties can be supplied at a low cost. The powder is preferably used as a material for powder coatings, cosmetics and lubricants and for various other purposes.

DETAILED EXPLANATION OF THE INVENTION

The present invention includes two embodiments. One embodiment is described below.

The present invention provides a process for producing a polymer powder characterized by separately melting two or more polymers or monomers which are reactive with each other and a mixture of which will be solid at ambient temperature and will have a melt viscosity at 300° C. of 500 cps or below, continuously mixing and spraying them, cooling the sprayed mixture to form a powder and subjecting the powder to a solid phase polymerization.

The term "polymer" as used herein refers to a polymeric compound having a low molecular weight of about 100 to 10,000 and being devoid of the excellent properties of plastics.

Polymeric compounds having higher molecular weights and excellent properties have such a high melt viscosity that only filamentous matter is formed when they are sprayed. To form a nearly spherical powder, the melt viscosity of the compound in the spraying step must be 500 cps or lower, preferably 200 cps or lower and still preferably 100 cps or lower. Moreover, it is undesirable to spray the polymers or monomers at a temperature of 300° C. or higher from the viewpoint of the thermal resistance of them. Since the sprayed mixture of the polymers or monomers gives rise to spherical particles by its surface tension, it must be kept in a molten state for a moment in the air. Therefore, it is effective for the object of the present invention to inhibit rapid solidification of the mixture with a heated inert gas.

When the two or more polymers or monomers, which are reactive with each other are, previously mixed together, they react with each other to form a polymer in the course of preheating to form a melt or during the transportation thereof to a spray nozzle. As a result, the mixture viscosity is increased to form filamentous matter by spraying and, in addition, a gel is formed in that part of the nozzle in which it stays to make the spraying impossible. A similar phenomenon occurs when polymers or monomers which react by themselves to form polymers such as a polyamide polymer having an amino group at one end thereof and a carboxyl group at the other end are used, since the viscosity increase cannot be controlled.

In the present invention, the above-described problems are solved by previously separately melting two or more polymers or monomers, each of which does not react by itself but which are reactive with each other, and continuously mixing the melts together. The mixing time in the present invention is preferably less than 1 sec, still preferably less than 0.5 sec. For example, two or more polymers or monomers each having a low viscosity are passed through a thin static mixer at a high speed.

The polymer or monomer mixture thus formed is immediately sprayed. In this step, an electro-static charge can be applied in order to reduce the size of the spray particles or to obtain a uniform particle size distribution. The formed, nearly spherical spray droplets are cooled and thereby solidified by contrast with a blown, cold, inert gas or with water to form a nearly spherical powder.

Another embodiment is described below.

The present invention provides a process for producing a polymer powder characterized by separately melting two or more polymers or monomers which are reactive with each other and a mixture of which will be solid at ambient temperature and will have a melt viscosity at 300° C. of 1000 cps or below, continuously mixing them and forming molten droplets with a high-speed disc, cooling them to form a powder and subjecting the powder to a solid phase polymerization.

The term "polymer" as used herein refers to a polymeric compound having a low molecular weight of about 100 to 10,000 and being devoid of the excellent properties of plastics.

Polymeric compounds having higher molecular weights and excellent properties have such a high melt viscosity that only filamentous matter is formed when they are sprayed by the centrifugal force of a high-speed disc. To form a nearly spherical powder, the melt viscosity of the compound in the spraying step must be 1000 cps or lower, preferably 500 cps or lower and still preferably 200 cps or lower. Meanwhile it is undesirable to form the droplets of the polymers or monomers at a temperature of 300° C. or higher from the viewpoint of the thermal resistance of them. Since the molten droplets give rise to spherical particles by the surface tension, they must be kept in a molten state for a moment in air. Therefore, it is effective for the object of the present invention to inhibit rapid solidification of the drops with a heated inert gas.

When the two or more polymers or monomers which are reactive with each other are previously mixed together, they react with each other to form a polymer in the course of preheating to form a melt or during the transportation thereof to the high-speed disc. As a result, the mixture's viscosity is increased to form filamentous matter by spraying and, in addition, a gel is formed in that part of the disc in which it stays to make droplet formation impossible. A similar phenomenon occurs when polymers or monomers which react by themselves to form polymers such as a polyamide polymer having an amino group at one end thereof and a carboxyl group at the other end are used, since the mixture's viscosity increase cannot be controlled.

In the present invention, the above-described problems are solved by previously separately melting two or more polymers or monomers, each of which does not react by itself but which are reactive with each other and continuously mixing the melts together. The mixing time in the present invention is preferably less than 1 sec, still preferably less than 0.5 sec. For example, two or more polymers or monomers each having a low viscosity are passed through a static mixer at a high speed immediately before feeding them to a high-speed disc. In a preferred process, two or more polymers or monomers each having a low viscosity are separately fed to the high-speed disc and thereby mixed together.

The polymers or monomers are fed to the disc, as a mixture of them or separately, spread toward the periphery of the disc by a centrifugal force to form a film and sprayed away from around the disc. The periphery of the disc can be roughened in order to adjust the size of the droplets. An electrostatic charge can be applied from the periphery of the disc in order to prevent reagglomeration of the droplets or to facilitate the recovery of the powder. Further far infrared rays may be applied to the disc with a laser in order to reduce the viscosity of the melt. The formed nearly spherical droplets are solidified by contact with a blown, cold, inert gas or with water to form a powder comprising nearly spherical particles.

The obtained spherical powder is subjected to solid phase polymerization by an ordinary process to form the intended polymer powder. Namely, the polymerization is conducted at a temperature at which the powder particles are not bonded together. For example, a polyamide resin is gradually polymerized by being heating to a temperature lower than its melting point by 5° to 20° C., preferably in an inert gas or in a vacuum, to form a polymer. The polymerization time is variable depending on the intended degree of polymerization. Usually the polymerization is conducted for several hours to several tens of hours.

EXAMPLE

The following Examples will further illustrate the present invention.

EXAMPLE 1

5 kg of aminododecanoic acid, 267 g of dodecanedioic acid and 10 g of phosphoric acid were subjected to melt polymerization at 250° C. for 5 h to form a nylon 12 polymer having a carboxyl group at each of its ends. The relative viscosity of a 0.5% solution of this polymer in m-cresol was 1.20. Separately, 5 kg of aminododecanoic acid and 135 g of hexamethylenediamine were subjected to polymerization at 250° C. under pressure for 1 h and then the pressure was returned to atmospheric pressure to continue the polymerization for additional 5 h to form nylon 12 polymers having an amino group at each of their ends. The relative viscosity of a 0.5% solution of this polymer in m-cresol was 1.19.

Pipes for the respective polymers were connected to respective gear pumps and the pipes coming from the gear pumps were joined together. A static mixer having an internal diameter of 6 mm and a length of 100 mm was provided adjacent to the joint and an airless spray nozzle (LV Nozzle; mfd. by Nordson K.K.) was attached to the outlet of the mixer. All these devices were placed in an oven and the tip of the nozzle was protruded from the oven. A cooling chamber designed so that water flows along the walls thereof was placed in front of the nozzle.

Both the polymers were separately heated to 250° C. to melt and fed into the gear pumps through their respective pipes. The temperature in the oven was kept at 250° C. The gear pumps were controlled so that both the polymers would flow at a rate of 100 ml/min.

Water was fed so that it flowed in the cooling chamber. A powder formed by spraying the mixture from the nozzle and solidifying it was taken together with the stream of water to obtain a powder comprising nearly spherical particles having a diameter of about 150$\mu$.

The powder recovered by filtration was placed in a stainless steel fluidization tank and nitrogen heated to 160° C. was introduced thereinto through the bottom thereof for 24 h to conduct solid phase polymerization. A 0.5% solution of the obtained powder in m-cresol had a relative viscosity of 1.60.

An iron plate having a thickness of 3 mm was coated with the powder by a fluidization dip coating method to form a smooth coating film.

EXAMPLE 2

5 kg of aminododecanoic acid, 267 g of dodecanedioic acid and 10 g of phosphoric acid were subjected to melt polymerization at 250° C. for 5 h to form a nylon 12 polymer having a carboxyl group at each of its ends. The relative viscosity of a 0.5% solution of this polymer in m-cresol was 1.20. Separately, 5 kg of aminododecanoic acid and 135 g of hexamethylenediamine were subjected to polymerization at 250° C. under pressure for 1 h and the pressure was returned to an atmospheric pressure to continue the polymerization for additional 5 h to form nylon 12 polymers having an amino group at each of their ends. The relative viscosity of a 0.5% solution of this polymer in m-cresol was 1.19.

Both the polymers were melted in respective melting tanks and the melts were fed to a high-speed disc through respective pipes by means of respective gear pumps. The pipes of the melting vessels were kept at 250° C.

The disc was one made of brass and having 30 peripheral sprocket-like projections. Four nozzles for continuously feeding the polymers were placed nearly concentrically on the disc. Among the four nozzles, two nozzles were connected to the pipe for the polymer having an amino group at each of its ends and the rest were connected to the pipe for the polymer having a carboxyl group at each of its ends. The disc (except the shaft for rotating the disc and the four nozzles) was sandwiched in between heating plates having a diameter of 50 cm which was heated at about 280° C. at a distance of 5 cm.

The disc was rotated at 30,000 rpm and the polymers were fed to the disc at a rate of 50 ml/min from the gear pumps through the four nozzles. Powders coming out radially from between the heating plates were collected to obtain powder comprising spherical particles having a diameter of about 100$\mu$.

The powder thus obtained was placed in a stainless steel fluidization tank and nitrogen heated to 160° C. was introduced therein through the bottom thereof for 24 h to conduct solid phase polymerization. A 0.5% solution of the obtained powder in m-cresol had a relative viscosity of 1.59.

An iron plate having a thickness of 3 mm was coated with the powder by a fluidization dip coating method to form a smooth coating film.

What is claimed is:

1. A process for producing a product polyamide powder, said process comprising the steps of:
   separately melting two or more polyamides which are reactive with each other to form said product polyamide;
   forming a molten mixture of the melted two or more polyamides by continuously mixing with each other, the molten mixture being a solid at a normal temperature and having a melt viscosity of 1,000 cps or below at 300° C.;
   forming liquid drops of the molten mixture with a high speed rotating disc;
   cooling the liquid drops to obtain a powder thereof; and
   solid phase polymerizing said powder to obtain said product polyamide powder.

2. The process as claimed in claim 1, in which the mixture has a melt viscosity of 500 cps or below.

3. The process as claimed in claim 1, in which the two or more polyamides comprise a first polyamide having a carboxylic acid group as at least 70 percent of the terminal group thereof and a second polyamide having an amine group as at least 70 percent of the terminal groups thereof.

4. The process as claimed in claim 1, in which the molten mixture has a melt viscosity of 200 cps or lower.

* * * * *